Feb. 1, 1927.
A. J. SLONECKER
1,616,336
UNIVERSAL JOINT
Filed Dec. 20, 1922
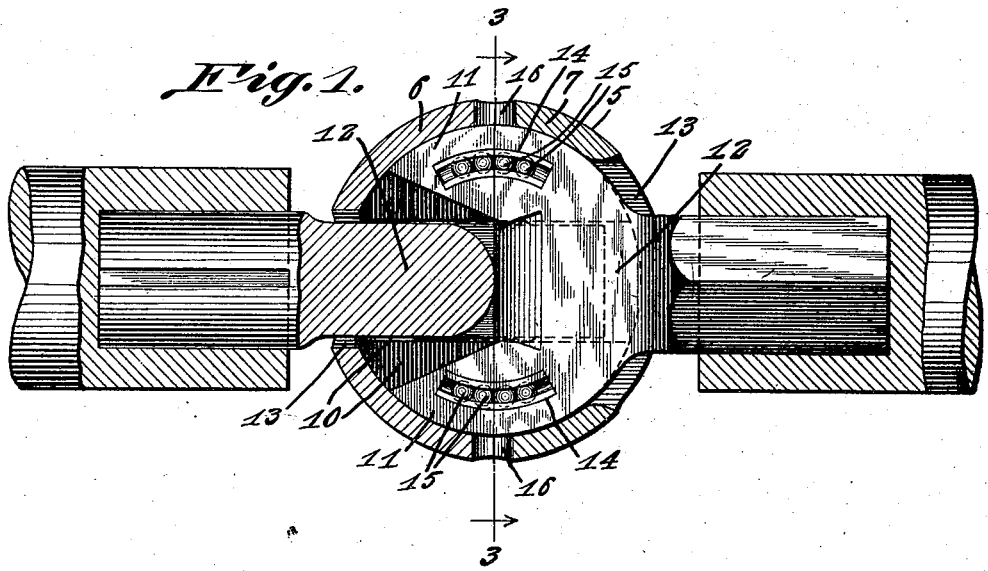
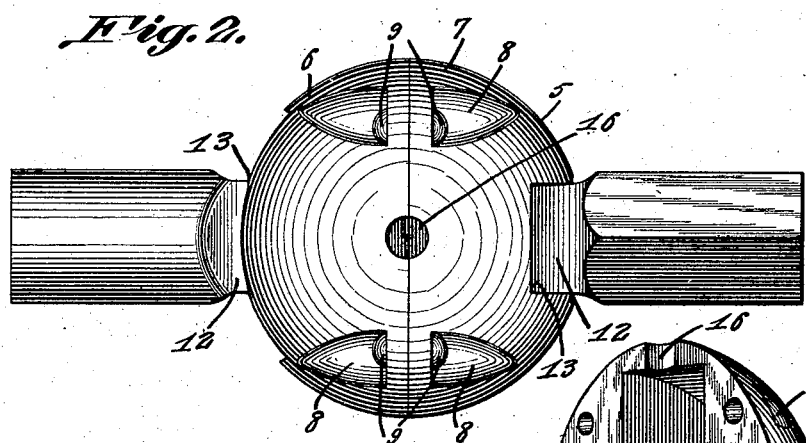
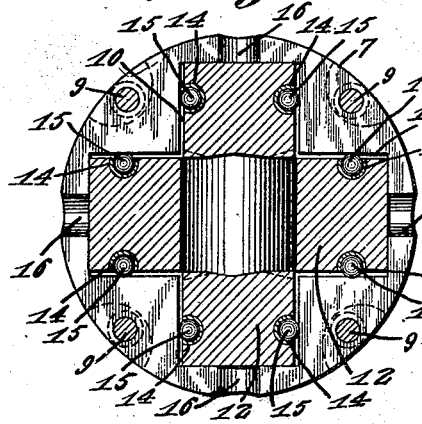
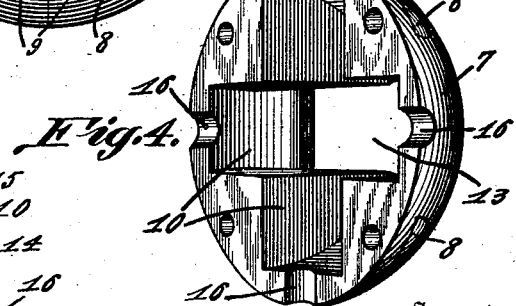
A. J. Slonecker, Inventor Patented Feb. 1, 1927.

1,616,336

UNITED STATES PATENT OFFICE.

ABIRAM J. SLONECKER, OF TRENTON, MISSOURI.

UNIVERSAL JOINT.

Application filed December 20, 1922. Serial No. 608,033.

This invention relates to universal joints and aims to provide a novel form of joint wherein the sections thereof may be readily and easily disconnected and assembled to facilitate the repairing thereof.

Another object of the invention is to provide a joint of this character wherein the wall of the body portion receives the direct strain of the sections when longitudinal strain is brought to bear thereon.

A further object of the invention is the provision of means to insure free movement between the sections of the joint, thereby reducing the friction between the sections of the joint, to the minimum.

A still further object of the invention is to provide a sectional body portion wherein the sections may be brought together around the bifurcated ends of the shaft sections to facilitate the positioning of the bifurcated sections of the joint.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a sectional view through a universal joint constructed in accordance with the present invention.

Figure 2 is an elevational view thereof.

Figure 3 is a sectional view taken on line 3—3 of Figure 1.

Figure 4 is a perspective view of one of the sections of the housing.

Referring to the drawing in detail, the housing is indicated generally by the reference character 5 and includes opposed sections 6 and 7 which are formed with depressions 8 adjacent to the inner edges thereof to provide clearances for the securing bolts 9 that secure the sections of the housing together.

The sections are formed with oppositely disposed grooves 10 that receive the bifurcated ends 11 of the sections 12, suitable cut out portions 13 being provided in the sections 6 and 7 and aligning with the grooves 10 to permit the shank portion of the bifurcated sections to extend therethrough.

As shown, the outer extremities of the bifurcated sections are curved to conform to the curvature of the housing to restrict lateral movement of the bifurcated sections with respect to the housing. The bifurcated sections interlock, as shown by Figure 1 of the drawing, and are provided with grooves 14 forming run-ways for the balls 15 that contact with the inner walls of the grooves and reduce friction between the elements of the joint, to the minimum.

From the foregoing it will be seen that due to the construction of the universal joint, the driving strain of the connection is transmitted from the bifurcated sections to the walls of the grooves, while the longitudinal strain of the connection is taken up by the walls of the housing.

Each of the sections of the housing is formed with semi-circular openings 16, which, when brought together provide openings to permit a lubricating medium to be forced between the sections of the joint.

What is claimed is:—

A universal joint embodying a sectional spherical member having elongated openings disposed at right angles with respect to each other, said openings defining substantially straight walls, bifurcated sections having curved outer edges conforming to the curvature of the spherical member, the bifurcated sections interlocking, said bifurcated sections having curved grooves formed in the outer surfaces thereof, said curved grooves defining ball races, balls mounted in the grooves and adapted to engage the straight walls of the spherical member.

In testimony that I claim the foregoing as my own, I have hereto affixed my signature.

ABIRAM J. SLONECKER.